Nov. 2, 1926.
G. A. LONG
CLAMP
Filed June 21, 1922
1,605,597
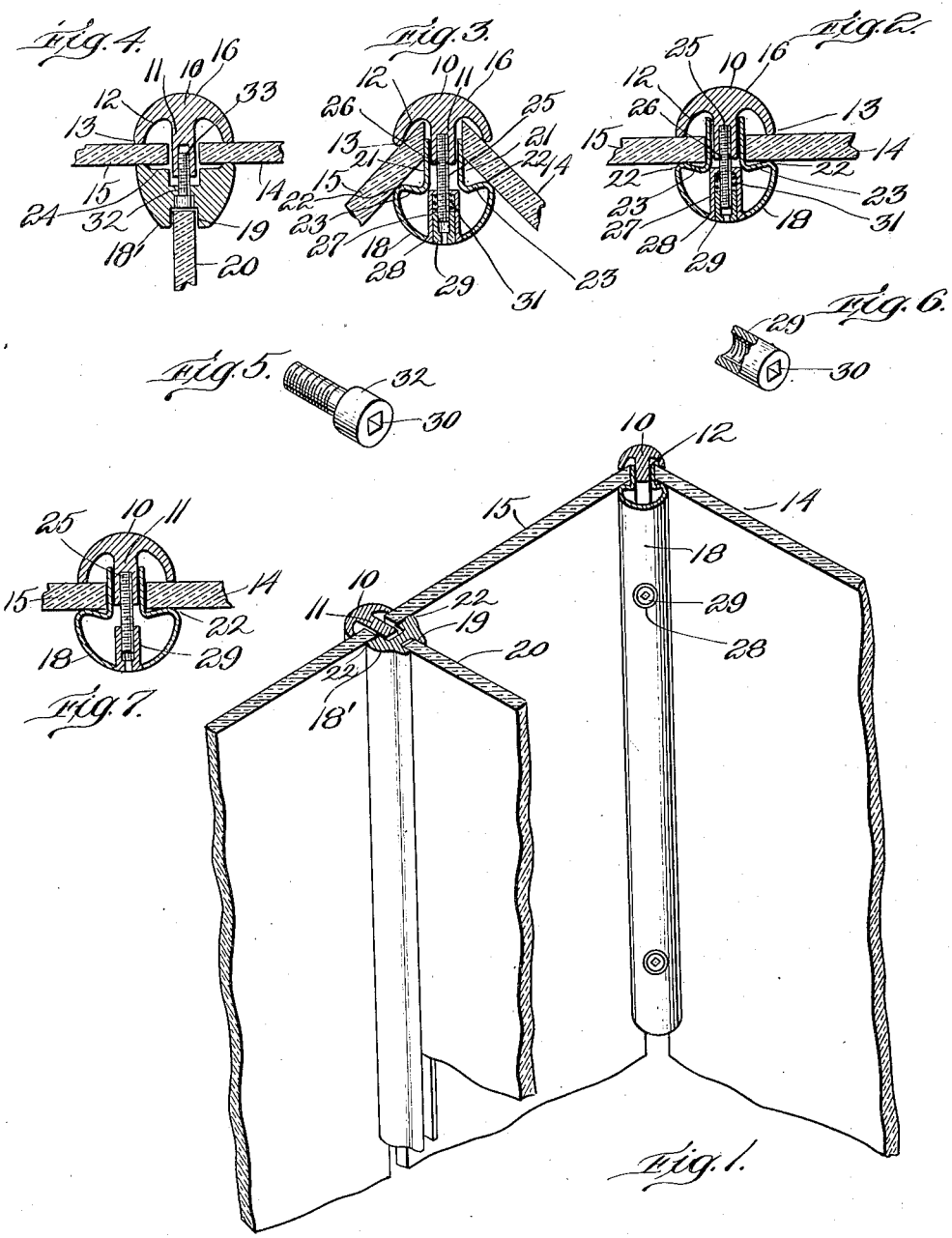
Inventor:
George A. Long,
by Joseph T. Brennan
atty.

Patented Nov. 2, 1926.

1,605,597

UNITED STATES PATENT OFFICE.

GEORGE A. LONG, OF BOSTON, MASSACHUSETTS.

CLAMP.

Application filed June 21, 1922. Serial No. 570,037.

My invention relates to clamps for securing together contiguous or adjoining plates, more especially plates or panes of glass such as are used for store windows, show cases and the like, and it has for its object to provide an improved clamp of this kind adapted to connect plates which are disposed either in alinement or at various angles.

The invention consists of a clamp of the character described having the peculiar features of construction and mode of operation set forth in the following description and particularly pointed out and defined in the claims at the close thereof.

In the accompanying drawings:

Figure 1 is a perspective view of a portion of a structure embodying two forms of clamps constructed in accordance with my invention.

Figure 2 is a sectional view of one form of clamp showing the same applied to two panes or plates of glass that are in alinement.

Figure 3 is a sectional view of the same clamp applied to two plates or panes that are disposed at an angle.

Figure 4 shows, in section, another form of clamp applied to two plates or panes of glass that are in alinement.

Figure 5 is a detail relating to the form shown in Figure 4.

Figure 6 is a detail relating to the form of clamp shown in Figures 2 and 3.

Figure 7 is a sectional view of the clamp shown in Figure 2, but without the yielding feature hereinafter referred to.

Referring to the drawings, 10 is a rigid metal bar constituting the outer member hereinafter referred to, which is made T-shaped in cross-section so as to provide it with a centrally disposed rib 11. This outer member 10 is formed upon its inner side with channels 12 at each side of the rib 11 which provide longitudinal side edges 13 adapted to engage the glass plates or panes 14, 15 which are to be secured together by the clamp. The channels 12 serve, also, to provide clearance for the plates 14, 15, when the latter are set at an angle as shown in Figure 3. The outer surface 16 of the member 10 is preferably rounded so as to ensure a wearing surface free from edges and easy to clean. The rib 11 preferably extends inwardly beyond the plane of the side edges 13 of member 10 and serves to increase the rigidity thereof, as well as a tongue to engage with an inner member 18, which may be made of bar construction as shown in Figure 4, but which is preferably a strip of sheet metal bent into the shape of a hollow bar provided with two longitudinally disposed separated flanges 21 which provide between them a groove or slot that is occupied by the rib 11 of the outer member 10. The engagement of the flanges 21 with the rib 11 serves to center or position the outer member 10, while their confinement within the slot between the two panes or plates 14, 15, holds the member 18 against being distorted under strains. Also, the flanges 21 may serve as yielding abutments for the edges of the panes or plates 14, 15.

The member 18, like the outer member 10, is formed with depressions or channels 23 upon its inner side so that only the outer side edges 22 thereof contact with the plates 14, 15, regardless of the angle at which they are set. This gives substantially a line contact between the inner member and each plate which ensures a reasonably tight joint without the use of putty, or use of strips of yielding material. It is also an advantage to construct the member 18 from sheet metal as described for the reason that it provides an inner member that is sufficiently flexible laterally to conform to irregularities in the glass, and because it provides an inner member that is sufficiently stiff and strong and yet not wholly rigid so that it can yield, more or less, when either glass pane or plate is flexed or bowed under the influence of wind pressure or the like. The feature of gripping the pane or plate of glass between two opposed edges 13 and 22 extending longitudinally of the clamp is important and advantageous since the pane or plate is then left free to fulcrum or swing on these edges when flexed by wind pressure or the like, particularly when the parts are assembled as in Figure 2.

To fasten the two members 10 and 18 together and clamp them to the two plates 14, 15, I prefer to use the construction shown in Figures 2 and 3, which is as follows:— Extending inwardly from the edge of the rib 11, I provide, at intervals throughout the length of said rib, studs 25 which are threaded throughout their length and inserted in holes drilled in the rib, and then swaged as at 26 to fasten them rigidly in place.

Corresponding in position with the studs projecting from the rib 11 on the outer member, are holes drilled or punched in the inner member 18 and preferably countersunk to engage the flared ends 28 of thimbles 27, one of which is mounted in each hole. These thimbles are provided to serve as pockets for coiled springs 31 and nuts 29, there being a nut and spring in each thimble. Each nut is screwed onto its stud 25 and acts through its spring to yieldingly clamp the two members 10 and 18 against the plates. Each nut may be provided with a non-circular hole or socket 30 adapted to receive a key by means of which it is operated. Where it is found desirable the springs 31 may be omitted from the construction.

In the modification shown in Figure 4 I have shown a screw 32 which is tapped into the rib 11 on the outer member 10 as at 33, the head of said screw abutting the inner member 18.

This form shown in Figure 4 is particularly adapted for show cases including one or more partitions 20, the inner member 18 of said form being made with a groove 19 to be occupied by the edge of the partition as shown in Figures 1 and 4. In this case the inner member 18' may be a solid metal bar provided upon its inner face or side with a groove within which is fitted the rib 11 of the outer member 10, and having said inner face or side channeled or recessed as at 24 so that it contacts with the panes or plates only along the elevated side edges 22.

What I claim is:

1. A clamp for fastening adjoining edges of plates, comprising in combination, an outer member, of crescent-shape in cross section, having a rib projecting from the hollow of the crescent for insertion between the plate-edges; an inner member, of crescent-shape in cross section having reentrant portions extending from its edges within the crescent and terminating in flanges adapted for insertion between the plate-edges, on both sides of said rib; and means for fastening said members together, to clamp the plates between them; the outer edges of each member making line contact with the surfaces of the plates to effect a tight leak-proof joint.

2. A clamp for fastening adjoining edges of plates comprising, in combination, a solid T-shaped member having a rib extending between the plate-edges and having the side edges of its head in continuous line contact with one surface of the plate; a tubular member having flanges positioned one on each side of said rib, and having side edges in continuous line contact with the surface of plate opposite to that in contact with the solid member; and means for fastening said members together; the space between the flanges of the tubular member being greater than the thickness of the said rib, whereby the tubular member may be adjusted laterally with respect to the solid member to accommodate variations in the thickness of the plates.

3. A clamp for fastening adjoining edges of plates, comprising, in combination, a bar that is T-shaped in cross-section, the leg of the T extending between the plate edges and the arms of the T curving toward the plate and being shaped to make line contact with the surfaces of the plates; another bar, also T-shaped in cross-section having edges at the extremities of its arms in line contact with the opposite surfaces of the plates, and having a hollow leg portion extending between the plate edges and receiving the leg portion of the first mentioned bar; a screw stem fastened to the leg of the first mentioned bar and extending through the leg of the second; and a nut associated with the second bar and engaging said stem, whereby the bars are clamped against the plates.

Signed at Boston, Massachusetts, this first day of June, 1922.

GEORGE A. LONG.